(12) United States Patent
Meira Pires de Azevedo et al.

(10) Patent No.: US 11,487,909 B2
(45) Date of Patent: Nov. 1, 2022

(54) SYSTEMS AND METHODS FOR MANAGING CONTENT

(71) Applicant: Meta Platforms, Inc., Menlo Park, CA (US)

(72) Inventors: Fabiana Meira Pires de Azevedo, San Francisco, CA (US); Marc Thomas Cruz, Dublin, CA (US); Matthew Miklasevich, Menlo Park, CA (US); Arvin Aminpour, Redwood City, CA (US); Bonan Dong, Mountain View, CA (US); Jason Rose, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 88 days.

(21) Appl. No.: 17/164,297

(22) Filed: Feb. 1, 2021

(65) Prior Publication Data

US 2021/0232714 A1    Jul. 29, 2021

Related U.S. Application Data

(63) Continuation of application No. 15/844,033, filed on Dec. 15, 2017, now abandoned.

(51) Int. Cl.
*G06F 21/84* (2013.01)
*G06F 21/62* (2013.01)
*G06N 20/00* (2019.01)

(52) U.S. Cl.
CPC .......... *G06F 21/84* (2013.01); *G06F 21/6218* (2013.01); *G06N 20/00* (2019.01); *G06F 2221/2101* (2013.01); *G06F 2221/2107* (2013.01)

(58) Field of Classification Search
CPC combination set(s) only.
See application file for complete search history.

(56) References Cited

U.S. PATENT DOCUMENTS

| | | | |
|---|---|---|---|
| 9,165,144 B1* | 10/2015 | Goldstein | G06F 21/60 |
| 2012/0303558 A1* | 11/2012 | Jaiswal | G06N 20/00 |
| | | | 706/12 |
| 2015/0208192 A1* | 7/2015 | Dugan | H04W 4/21 |
| | | | 455/414.3 |
| 2016/0110352 A1* | 4/2016 | Bendersky | G06F 21/64 |
| | | | 707/602 |
| 2016/0300075 A1* | 10/2016 | Stankiewicz | G06F 16/24568 |
| 2018/0081529 A1* | 3/2018 | Zhang | G06F 3/0482 |
| 2018/0082068 A1* | 3/2018 | Lancioni | G06F 21/84 |
| 2018/0260734 A1* | 9/2018 | Beveridge | G06N 20/00 |

(Continued)

*Primary Examiner* — Saleh Najjar
*Assistant Examiner* — Devin E Almeida
(74) *Attorney, Agent, or Firm* — Sheppard Mullin Richter & Hampton LLP

(57) ABSTRACT

Systems, methods, and non-transitory computer readable media are configured to determine a likelihood of a user choosing to reveal a given content item when contents of the content item are obscured. The likelihood can be determined based at least in part on a trained machine learning model. An extent by which to obscure the content item based at least in part on the likelihood can be determined. Subsequently, an obscured version of the content item can be provided for display. The content item can be obscured based at least in part on the determined extent.

20 Claims, 9 Drawing Sheets

(56) References Cited

U.S. PATENT DOCUMENTS

2018/0285592 A1* 10/2018 Sharifi .................... G06F 21/35
2018/0285599 A1* 10/2018 Praveen ............. G06K 9/00523
2018/0357984 A1* 12/2018 Xia ..................... G06F 3/04883
2018/0374431 A1* 12/2018 Adams .................... G06F 21/84

* cited by examiner

500

```
Determine a likelihood of a user choosing to reveal a given content item when contents of
the content item are obscured, the likelihood being determined based at least in part on a
trained machine learning model
502
```

```
Determine an extent by which to obscure the content item based at least in part on the
likelihood
504
```

```
Provide an obscured version of the content item for display, wherein the content item is
obscured based at least in part on the determined extent
506
```

FIGURE 5

SYSTEMS AND METHODS FOR MANAGING CONTENT

CROSS-REFERENCE TO RELATED APPLICATIONS

This application is a continuation of U.S. patent application Ser. No. 15/844,033, filed on Dec. 15, 2017 and entitled "SYSTEMS AND METHODS FOR MANAGING CONTENT", which is incorporated in its entirety herein by reference.

FIELD OF THE INVENTION

The present technology relates to the field of computerized social networking systems. More particularly, the present technology relates to techniques for managing content within computerized social networking systems.

BACKGROUND

Users often utilize computing devices for a wide variety of purposes. For example, users of a social networking system can use their computing devices to interact with one another, access content, share content, and create content. The users of the social networking system can have diverse interests. The users of the social networking system can also come from diverse backgrounds. Because of this, a user who is accessing a content item can have different interests than a user who has created or shared the content item. Likewise, a user who is accessing a content item can come from a different background than a user who has created or shared the content item.

SUMMARY

Various embodiments of the present disclosure can include systems, methods, and non-transitory computer readable media configured to determine a likelihood of a user choosing to reveal a given content item when contents of the content item are obscured. The likelihood can be determined based at least in part on a trained machine learning model. An extent by which to obscure the content item based at least in part on the likelihood can be determined. Subsequently, an obscured version of the content item can be provided for display. The content item can be obscured based at least in part on the determined extent.

In an embodiment, content item feature data can be provided to the trained machine learning model. The content item feature data can comprise one or more of a sensitive content category or a sensitive content score.

In an embodiment, user feature data can be provided to the trained machine learning model.

In an embodiment, the obscured version of the content item can be generated. Generating the obscured version of the content item can comprise one or more of superimposing a block of color, wherein the determined extent corresponds to an opacity of the block of color; or applying a blur effect, wherein the determined extent corresponds to an intensity of the blur.

In an embodiment, a text overlay can be applied. The text overlay can provide a sensitive content warning.

In an embodiment, the obscured version of the content item can be presented via one or more of a profile, a feed, or a single content item display.

In an embodiment, an exposure indication can be received. Subsequently, the trained machine learning model can be retrained based on the exposure indication.

In an embodiment, the exposure indication can be complied with.

In an embodiment, a content item representation can be provided to a second trained machine learning model. One or more of a sensitive content category or a sensitive content score can be received from the second trained machine learning model.

In an embodiment, the content item representation can comprise one or more concepts.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example process, according to an embodiment of the present disclosure.

Figure 1:
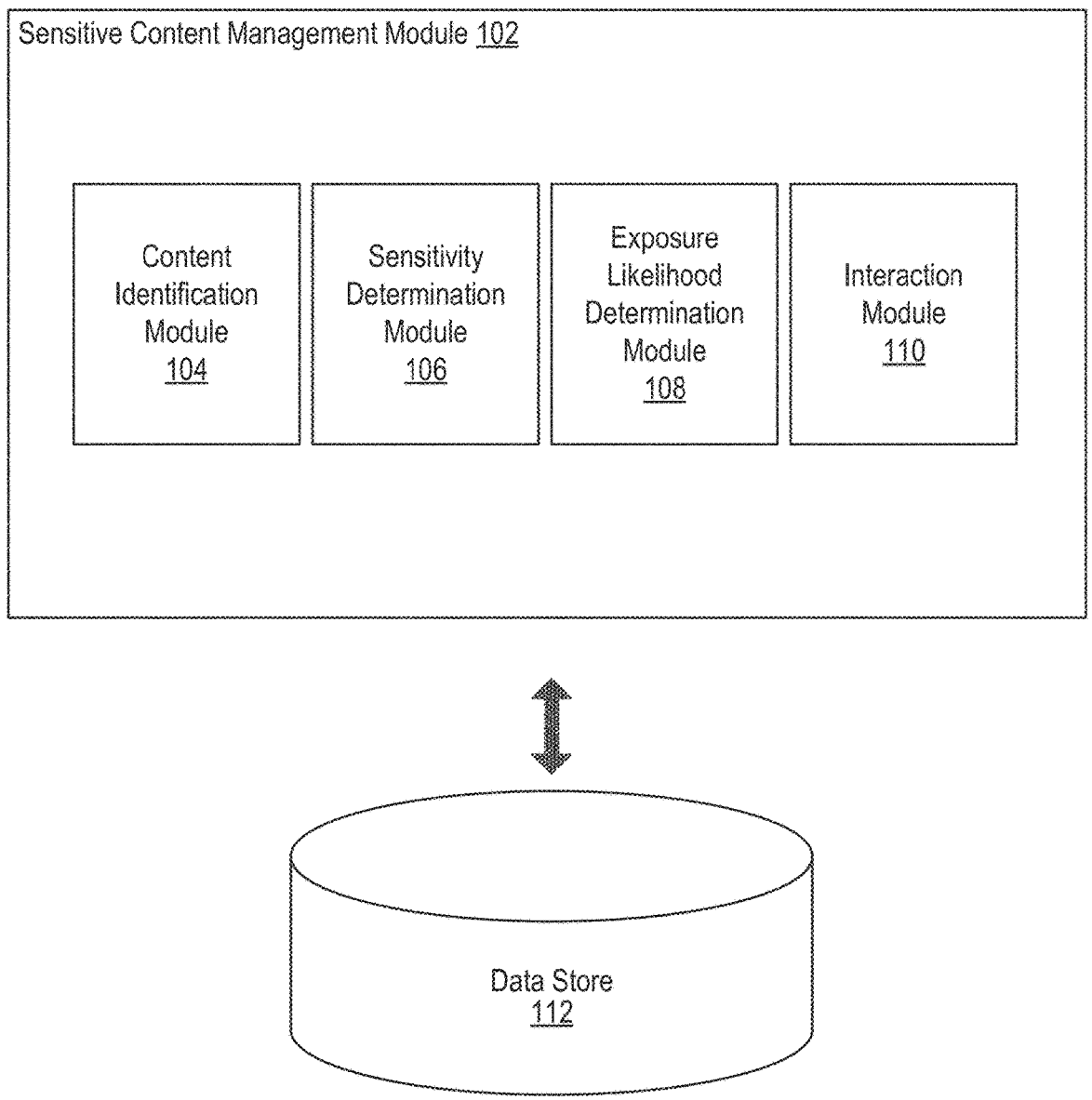
FIG. 1 illustrates an example system including an example sensitive content management module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Managing Content

Users often utilize computing devices for a wide variety of purposes. For example, users of a social networking system can use their computing devices to interact with one another, access content, share content, and create content. The users of the social networking system can have diverse interests. The users of the social networking system can also come from diverse backgrounds. Because of this, a user who is accessing a content item can have different interests than a user who has created or shared the content item. Likewise, a user who is accessing a content item can come from a different background than a user who has created or shared the content item.

Where a first user of a social networking system accesses a content item which was provided by a second user, the two users may differ in interests and/or backgrounds. When this occurs, the content item may reflect subject matter that strikes the first user as being unusual or unfamiliar. Under some circumstances, this can be a positive experience for the first user. For instance, the first user can be introduced to new ideas. However, under other circumstances, the first user can have a negative experience. For instance, the first user can be offended or disturbed by the subject matter captured in the content item.

According to conventional approaches, processes can select content items for a user that are similar to content items which the user has found appealing in the past. Content items that are similar to content items which the user has found appealing in the past are unlikely to be offensive or disturbing to that user. Therefore, these approaches can sometimes tend to be successful in decreasing the possibility of the user being presented with a content item which he or she finds to be offensive or disturbing. However, simply selecting content items similar to those found appealing by the user in the past can lead to what is sometimes termed an "echo chamber" effect. In this "echo chamber," users are shielded from new ideas and instead are repeatedly presented with old ideas. As such, conventional approaches can fail to achieve simultaneously shielding users from offensive or disturbing content items while allowing those users to be presented with new ideas.

Due to these or other concerns, the aforementioned and other conventional approaches specifically arising in the realm of computer technology can be disadvantageous or problematic. Therefore, an improved approach can be beneficial for addressing or alleviating various drawbacks associated with conventional approaches. Based on computer technology, the disclosed technology can allow content items to be presented to users in an effective manner. In some embodiments, a social networking system can select content items to be presented to a user. In various embodiments, the social networking system can obscure some or all of the selected content items with sensitive content screens. Subsequently, the social networking system can use a first machine learning model to determine sensitive content categories and/or sensitive content scores for the selected content items. The social networking system can then use a second machine learning model to generate respective exposure likelihood predictions (or scores) for each of the selected content items. An exposure likelihood prediction can measure a likelihood of the user choosing to reveal (or view) a content item when the content item is obscured by a sensitive content screen. The social networking system can utilize the sensitive content categories in generating exposure likelihood predictions. In some embodiments, exposure likelihood predictions for content items can be specific to the user.

The extent to which a content item is obscured may vary, for example, based on an exposure likelihood prediction generated for the content item. The social networking system can provide obscured content items for presentation to the user. Next, the social networking system can determine whether or not the user chooses to reveal (or view) any of the obscured content items. Where the user chooses to reveal an obscured content item, the social networking system can present to the user an unobscured version of the content item. In some embodiments, the social networking system can retrain the second machine learning model based on the choices of the user. More details regarding the discussed technology are provided herein.

FIG. 1 illustrates an example system 100 including an example sensitive content management module 102, according to an embodiment of the present disclosure. As shown in the example of FIG. 1, the sensitive content management module 102 can include a content identification module 104, a sensitivity determination module 106, an exposure likelihood determination module 108, and an interaction module 110, which are discussed in more detail herein. In some instances, the example system 100 can include at least one data store 112. The components (e.g., modules, elements, etc.) shown in this figure and all figures herein are exemplary only, and other implementations can include additional, fewer, integrated, or different components. Some components may not be shown so as not to obscure relevant details. In some embodiments, the sensitive content management module 102 can be implemented in a system, such as a social networking system. While the disclosed technology may be described herein in connection with a social networking system for illustrative purposes, the disclosed technology can be implemented in any other type of system or environment.

In some embodiments, the sensitive content management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the sensitive content management module 102 can be implemented, in part or in whole, as software running on one or more computing devices or systems. For example, the sensitive content management module 102 or at least a portion thereof can be implemented using one or more computing devices or systems that include one or more servers, such as network servers or cloud servers. In another example, the sensitive content management module 102 or at least a portion thereof can be implemented as or within an application (e.g., app), a program, an applet, or an operating system, etc., running on a user computing device or a client computing system, such as a user device 610 of FIG. 6. In some instances, the sensitive content management module 102 can, in part or in whole, be implemented within or configured to operate in conjunction with a system (or service), such as a social networking system 630 of FIG. 6. The application incorporating or implementing instructions for performing functionality of the sensitive content management module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that there can be many variations or other possibilities.

The sensitive content management module 102 can be configured to communicate and/or operate with the at least one data store 112, as shown in the example system 100. The at least one data store 112 can be configured to store and maintain various types of data. For example, the data store 112 can store information used or generated by the sensitive content management module 102. The information used or generated by the sensitive content management module 102 can include, for example, sensitive content categories, sensitive content scores, exposure likelihood predictions (or scores), user exposure choices, and training data. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content identification module 104 can select a content item to potentially be presented to a given user. The selected content item can be, for example, an image or a video. The content item may be selected using various approaches. For example, the content item may have been posted by another user that is recognized by the social networking system as a friend of the user. In another example, the content identification module 104 can select a content item which the content identification module 104 predicts to be of potential interest to the given user. The content item of potential interest can be a content item which is similar to content items in which the given user has expressed past interest. For instance, the content identification module 104 can select a content item that is similar to content items which the given user has previously liked, commented on, shared, or saved. The content identification module 104 can utilize a machine learning model in predicting content items of potential interest. There can be many variations or other possibilities.

The sensitivity determination module 106 can make sensitivity determinations for content items. For example, the sensitivity determination module 106 can make sensitivity determinations for content items selected by the content identification module 104. In some embodiments, the sensitivity determination module 106 can identify one or more concepts depicted in a given content item. For example, the concepts can include any terms and/or phrases that can be used to describe or characterize the contents (or subject matter) of the content item. For example, concepts can include nouns (e.g., tree, rock, grass, sky, dog, car), actions (e.g., running, jumping), setting descriptors (e.g., indoors, outdoors, room), composition descriptors (e.g., panorama, close-up), and the like. In certain embodiments, concepts can be identified using object recognition machine learning techniques. In such embodiments, each concept identified in the content item can be assigned a confidence score that measures a likelihood of that concept being depicted in the content item.

The social networking system in which the sensitive content management module 102 is implemented can enforce community guidelines. The community guidelines can place restrictions on the content that can be shared via the social networking system. As one example, a content item which violates the community guidelines can be removed from the social networking system. As another example, an attempt to provide a violating item to the social networking system can be blocked. In some embodiments, the removal or blocking can be performed via an automated process. In other embodiments, the removal or blocking can be performed by an administrator. Many variations are possible.

Further to the community guidelines, the social networking system can establish one or more sensitive content categories. The one or more sensitive content categories can include content which does not violate the community guidelines, but which may nevertheless be offensive or disturbing to some users. As one example, there can be a "disturbing" sensitive content category. The "disturbing" sensitive content category can include potentially disturbing content such as violence or cruelty. As another example, there can be a "suggestive" sensitive content category. The "suggestive" sensitive content category can include potentially inappropriate imagery or artistic imagery that may include instances of nudity or partial nudity. There can be many variations or other possibilities. In some embodiments, the social networking system can determine and store scores (e.g., sensitive content scores) for content items. In such embodiments, a sensitive content score for a given content item can convey an extent to which the content item may be considered to be offensive or disturbing by certain users. As one example, the scores can range between 0 and 100. Depending on the embodiment, the social networking system can assign either or both of a sensitive content category and a sensitive content score to a content item.

In some embodiments, the sensitivity determination module 106 can use one or more machine learning models that have been trained to predict sensitive content categories, sensitive content scores, or both for content items. For example, the sensitivity determination module 106 can train a machine learning model based on training data. The training data can include examples of content items for which users (e.g., administrators) have assigned one or more sensitive content categories and/or sensitive content scores. A training example corresponding to a given content item can include, as training input, a representation of the content item. The representation of the content item can describe concepts and corresponding confidence scores identified for the content item by the sensitivity determination module 106. Moreover, the training example can include, as training output, one or more sensitive content categories and/or a sensitive content score assigned to the content item. In some embodiments, the training data includes examples of content items that were determined to not include sensitive content. In these embodiments, these examples can include a training output specifying a "null" sensitive content category and/or a zero (0) sensitive content score. There can be many variations or other possibilities. Once the machine learning model has been trained, the sensitivity determination module 106 can use the machine learning model to make a sensitivity determination for a content item which has been selected by the content identification module 104. For example, the sensitivity determination module 106 can provide a representation of a content item as input to the machine learning model. As mentioned, this representation of the content item can describe concepts and corresponding confidence scores as determined by the sensitivity determination module 106. In response, the machine learning model can output one or more predicted sensitive content categories and/or a predicted sensitive content score for the content item. The predicted sensitive content categories and/or the predicted sensitive content score can constitute the sensitivity determination for the content item. In some embodiments, the machine learning model can be a neural network-based classifier or other type of classifier. The outputs predicted by the machine learning model can be sensitive content categories, sensitive content scores, or both. Many variations are possible.

The exposure likelihood determination module 108 can use a machine learning model to predict a likelihood that a given user will reveal (or view) a content item that is obscured by a sensitive content screen. As examples, the sensitive content screen can be an overlay, a blur effect, or the like on a content item or a user interface through which the content item is presented. In general, the sensitive content screen may be generated using any generally known technique for visually obfuscating content. The content item can be a content item for which the sensitivity determination module 106 has made a sensitivity determination. The exposure likelihood determination module 108 can be used when determining an extent to which the content item is obscured. Additional details regarding the exposure likelihood determination module 108 are provided below with reference to FIG. 2.

The interaction module 110 can obscure a content item with a sensitive content screen. The content item can be a content item for which the exposure likelihood determination module 108 has predicted a likelihood of the content item being revealed (e.g., viewed or accessed) by a user. The interaction module 110 can also determine when a user selects an option to remove the sensitive content screen and reveal the content item. Additionally, the interaction module 110 can retrain the machine learning model of the exposure likelihood determination module 108 based on such user actions. Additional details regarding the interaction module 110 are provided below with reference to FIG. 3.

Figure 2:
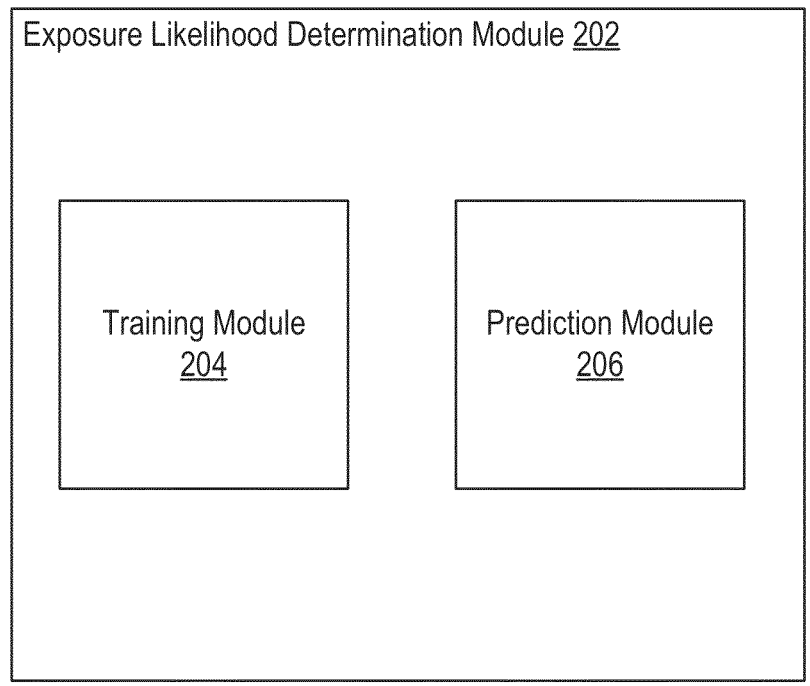
FIG. 2 illustrates an example of an exposure likelihood determination module, according to an embodiment of the present disclosure.

FIG. 2 illustrates an example exposure likelihood determination module 202, according to an embodiment of the present disclosure. In some embodiments, the exposure likelihood determination module 108 of FIG. 1 can be implemented as the example exposure likelihood determination module 202. As shown in FIG. 2, the exposure likelihood determination module 202 can include a training module 204 and a prediction module 206.

The training module 204 can perform initial training of a machine learning model to provide exposure likelihood predictions (or scores) for content items. In some embodiments, an exposure likelihood prediction corresponds to a likelihood of a user revealing (or viewing) a content item that has been obscured by a sensitive content screen. The machine learning model can, for example, be a neural network-based classifier or other type of classifier.

The initial training of the machine learning model can be performed prior to having information regarding user choices as to revealing or not revealing obscured content items. Later, when this information is possessed, the machine learning model can be retrained by the interaction module 110. As a substitute for this information, the initial training utilizes information regarding whether or not users perform certain social network actions. Examples of these social network actions include liking content items and viewing content items.

In some embodiments, the exposure likelihood predictions generated by the machine learning model can apply to groups of users (e.g., users sharing various demographic attributes). In such embodiments, the training data can be generated by presenting some or all of the groups of users with content items. Subsequently, the training module 204 can determine whether or not those users performed social network actions for those content items. Such information can be used to generate training examples. In some embodiments, a training example includes, as training input, feature data for a content item and feature data for the particular user to whom the content item was presented. The training example can also include, as training output, an indication of whether or not the user performed a social network action with respect to the content item. In some embodiments, feature data for a content item can include one or more of a sensitive content category for the content item and/or a sensitive content score for the content item. The sensitive content category and/or the sensitive content score can be generated by the sensitivity determination module 106. The feature data for the user can correspond to one or more attributes of the user. As examples, the feature data for the user can include one or more of a location of the user, a nationality or region of residence of the user, an age of the user, a gender of the user, types of connections of the user on a social networking system, types of actions performed by the user on a social networking system, and the like. Many variations are possible.

In other embodiments, the exposure likelihood predictions generated by the machine learning model are user-specific. In such embodiments, the training data can be generated by presenting content items to a given user and determining whether the user performed social network actions for those content items. Information regarding whether the user performed social network actions for the content items can be used to generate training examples. In some embodiments, a training example includes, as training input, feature data for a content item. The training example can also include, as training output, an indication of whether or not the user performed a social network action for the content item. The training module 204 can train the machine learning model based on the training data. Later, when information regarding choices of the user as to revealing or not revealing obscured content items is possessed, the machine learning model can be retrained by the interaction module 110. In some embodiments, a machine learning model can be trained specifically for each user. Many variations are possible.

As discussed, the social network actions can include liking a content item and viewing a content item. As further examples, the social network actions can include visiting a profile of a poster of a content item, commenting on a content item, and sharing a content item. Many variations are possible.

The prediction module 206 can formulate a prediction as to whether or not a given content item will be revealed (or viewed) by a given user when obscured by a sensitive content screen. As mentioned, the content item may be selected for the user by the content identification module 104. The sensitivity determination module 106 can have determined one or more of a sensitive content category and/or a sensitive content score for the content item. The prediction module 206 can utilize any of the machine learning models described above when making predictions. For example, the prediction module 206 can provide, as input to a machine learning model, feature data for a content item. The prediction module 206 can also provide feature data for a user as input to the machine learning model. The feature data for the content item can include one or more of the sensitive content category and/or the sensitive content score. The prediction module 206 can receive an exposure likelihood prediction from the machine learning model. The outputted exposure likelihood prediction can indicate a likelihood of the user revealing the content item. In some embodiments, the output can be a value between 0 and 1. In these embodiments, the value being larger can indicate an increased likelihood of the user revealing the content item. Many variations are possible. In some embodiments, where the sensitive content category is "null" or the sensitive content score is 0, the prediction module 206 does not make a prediction with respect to the content item or the content item is not sensitive. In these embodiments, the given content item is not obscured by a sensitive content screen.

Figure 3:
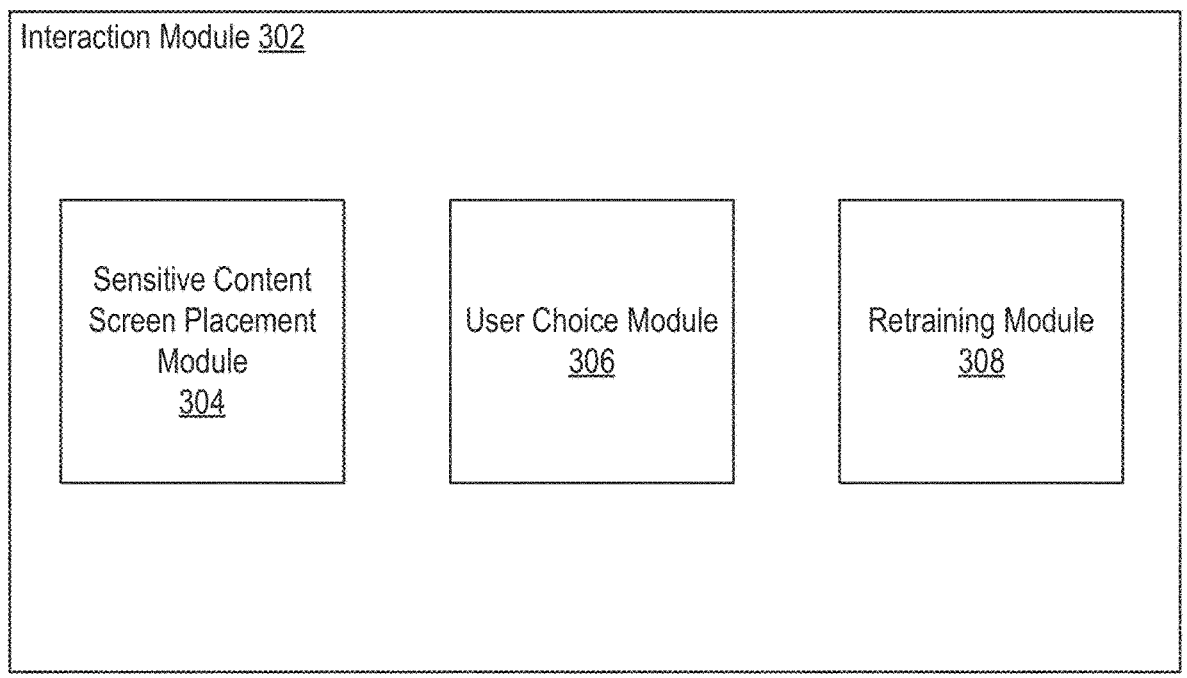
FIG. 3 illustrates an example of an interaction module, according to an embodiment of the present disclosure.

FIG. 3 illustrates an example interaction module 302, according to an embodiment of the present disclosure. In some embodiments, the interaction module 110 of FIG. 1 can be implemented as the example interaction module 302. As shown in FIG. 3, the interaction module 302 can include a sensitive content screen placement module 304, a user choice module 306, and a retraining module 308.

The sensitive content screen placement module 304 can obscure a content item with a sensitive content screen, and then present the content item to a user. The sensitive content screen placement module 304 can select an extent by which to obscure the content item. The sensitive content screen placement module 304 can use the determined likelihood of exposure in selecting this extent. In various embodiments, the extent to which a content item is obscured for a given user is inversely proportional to a determined likelihood of the user revealing the content item. The sensitive content screen placement module 304 can obscure the content item to a greater extent where the determined likelihood of exposure indicates that the user is less likely to reveal the content item. Likewise, the sensitive content screen placement module 304 can obscure the content item to a lesser extent where the determined likelihood indicates that the user is more likely to reveal the content item. In some embodiments, where the sensitivity determination module 106 determines a sensitive content category of null or a sensitive content score of zero for the content item, the sensitive content screen placement module 304 does not obscure the content item with a sensitive content screen.

The extent to which the sensitive content screen placement module 304 obscures a content item can be based on a sensitive content category to which the content item belongs. As an example, a given user may find a given sensitive content category to be offensive or disturbing, and a given content item may belong to this category. Under this circumstance, the exposure likelihood determination module 108 can determine a lower likelihood of the given user revealing the content item. Further, the sensitive content screen placement module 304 can obscure the content item to a greater extent. As a result, the given user can be more strongly shielded from the content item. As another example, a given user may not find a given sensitive content category to be offensive or disturbing, and a given content item may belong to this category. The exposure likelihood determination module 108 can respond to this circumstance by determining a higher likelihood of the given user revealing the content item. Further, the sensitive content screen placement module 304 can obscure the content item to a lesser extent. As a result, the given user may not be unnecessarily shielded from experiencing the content item.

In some embodiments, the sensitive content screen placement module 304 can obscure a content item by applying, to the content item, a sensitive content screen in the form of an overlay. The sensitive content screen placement module 304 can apply the overlay to the content item by superimposing a block of color over the content item. The block of color can be a dark color such as a black, a gray, or a brown, for example. In some embodiments, the sensitive content screen placement module 304 can select an opacity for the block of color by selecting a value for an alpha channel of the block of color. By setting a larger value for the alpha channel, the sensitive content screen placement module 304 can make the block more opaque. The block being more opaque can cause it to more strongly obscure the content item. The sensitive content screen placement module 304 can set a value for the alpha channel that is inversely proportional to the likelihood of the user revealing the content item. Many variations are possible.

Alternately or additionally, in some embodiments, the sensitive content screen placement module 304 can obscure the content item by applying a sensitive content screen in the form of an applied Gaussian blur or other blur effect. The sensitive content screen placement module 304 can select an intensity of the blur by selecting a value for the sigma of the blur. By setting a larger value for the sigma of the blur, the sensitive content screen placement module 304 can cause the blur to more strongly obscure the content item. The sensitive content screen placement module 304 can set a value for the sigma that is inversely proportional to the likelihood of the user revealing the content item. There can be many variations or other possibilities.

In some embodiments, the sensitive content screen placement module 304 can operate with respect to an exposure likelihood threshold. In these embodiments, where a likelihood of a user revealing a content item falls beneath the threshold, the sensitive content screen placement module 304 can obscure the content item by a fixed level of opacity and/or a fixed extent of blur. Also in these embodiments, where the likelihood of a user revealing a content item meets or exceeds the threshold, the sensitive content screen placement module 304 does not obscure that content item. Many variations are possible.

In some embodiments, the sensitive content screen placement module 304 can apply a text overlay to the obscured content item. The text overlay can warn a user about the content item. As an example, the text overlay can state "Sensitive Content" and/or "This photo contains sensitive content which some people may find offensive or disturbing." In some embodiments, the stated text for the obscured content item can vary depending on the sensitive content category of the obscured content item.

In some embodiments, the sensitive content screen placement module 304 can utilize a full version of the content item when obscuring the content item. In these embodiments, the block of color can be superimposed over the full version and/or the full version can be subjected to the blur effect. In other embodiments, the sensitive content screen placement module 304 can utilize a preview (or thumbnail) version of the content item when obscuring the content item. In these embodiments, the block of color can be superimposed over the preview version and/or the preview version can be subjected to the blur effect. In some embodiments, where the sensitive content screen placement module 304 obscures a content item with a sensitive content screen, comments posted in response to the content item by users of the social networking system can nevertheless be presented to a user. The presentation of the comments can serve to inform the user in making a decision as to whether or not to reveal the content item. In some embodiments, a user can opt out of sensitive content screen placement with respect to one or more sensitive content categories and/or with respect to one or more values or ranges of sensitive content scores. The sensitive content screen placement module 304 can comply with the opting out by not placing sensitive content screens on content items associated with those sensitive content categories and/or with respect to those values or ranges of sensitive content scores.

The user choice module 306 can operate with respect to the content item as obscured by the sensitive content screen placement module 304. The user choice module 306 can determine whether or not the user has chosen to reveal the obscured content item. As an example, the user choice module 306 can determine that the user took action to reveal the content item. Such action can include, for example, the user clicking or tapping on the content item. As another example, the user choice module 306 can determine that the user has chosen to not reveal the content item. As examples, the user can choose to not reveal the content item by failing to, within a predetermined period of time, click or tap on the content item. Many variations are possible.

Where the user choice module 306 determines the user has chosen to reveal the content item, the user choice module 306 can perform action consistent with the choice. For example, where the sensitive content screen placement module 304 utilized the full version of the content item when obscuring the content item, the user choice module 306 can newly present, without overlay or blur, the full version of the content item. As another example, where the sensitive content screen placement module 304 utilized the preview version of the content item when obscuring the content item, the user choice module 306 can retrieve a full version of the content item. Subsequently, the user choice module 306 can present the full version of the content item to the user. In some embodiments, where the user chooses to reveal the content item, the user can be given an option to re-obscure the content item. In these embodiments, where the user choses to re-obscure the content item, the user choice module 306 can newly present the content item in its obscured form.

Moreover, in some embodiments, the user choice module 306 can maintain a record of instances of the user choosing to reveal particular content items. In these embodiments, the sensitive content screen placement module 304 can consult the record when determining an extent to which to obscure a content item. In particular, where the record indicates that the user has previously chosen to reveal the content item, the sensitive content screen placement module 304 does not obscure the content item. As such, the sensitive content screen placement module 304 does not obscure the content item, even where a prediction provided by the machine learning model of the exposure likelihood determination module 108 would otherwise cause the content item to be obscured.

The retraining module 308 can perform retraining of the machine learning model with which the exposure likelihood determination module 108 operates. The retraining module 308 can retrain the machine learning model using instances of training data. The machine learning model can be retrained based on user feedback with respect to obscured content items. For example, the machine learning model can be retrained in response to a user deciding to reveal an obscured content item. In another example, the machine learning model can be retrained in response to a user deciding to obscure an unobscured content item. Many variations are possible.

Figure 4A:
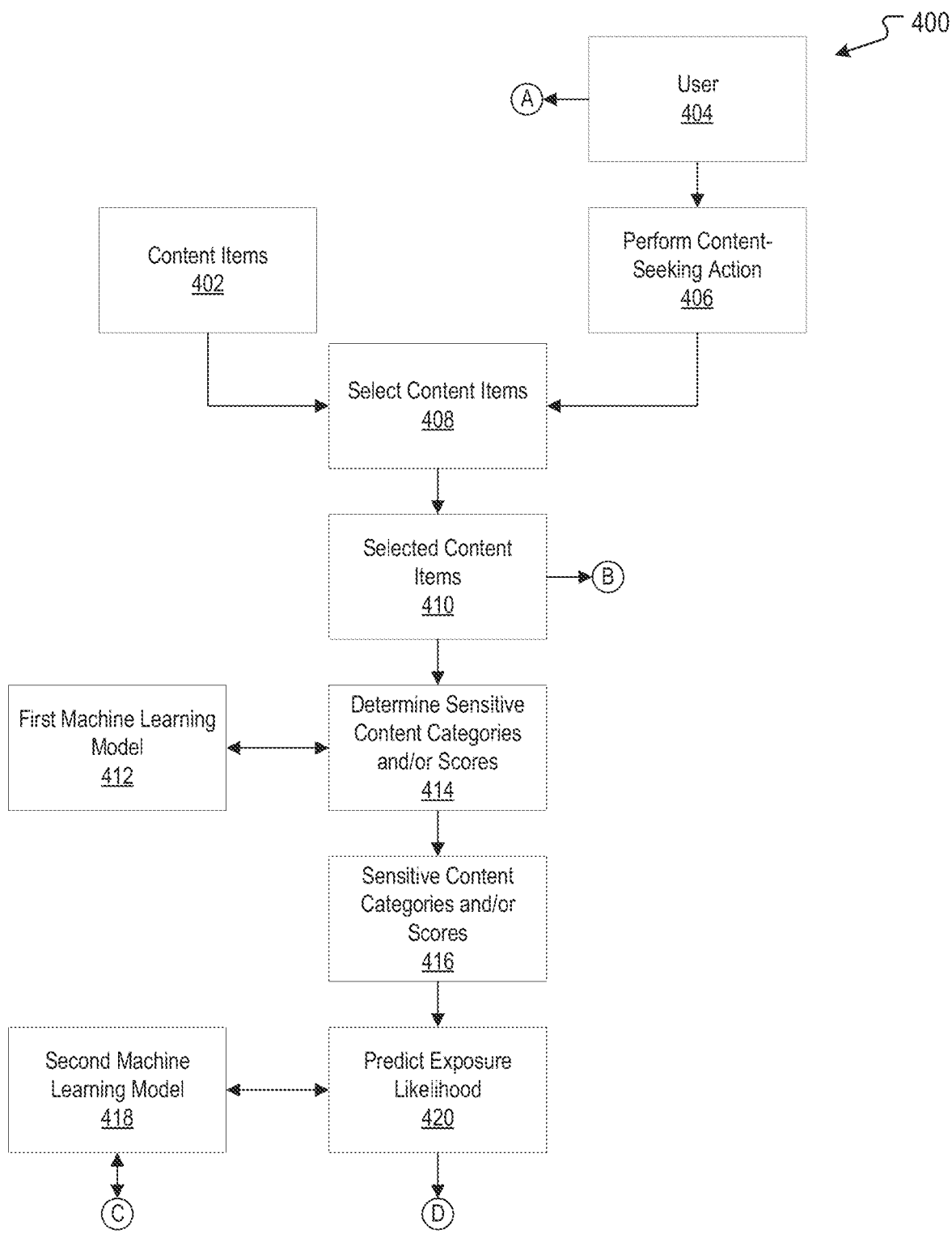
FIGS. 4A and 4B illustrate an example functional block diagram, according to an embodiment of the present disclosure.
Figure 4B:
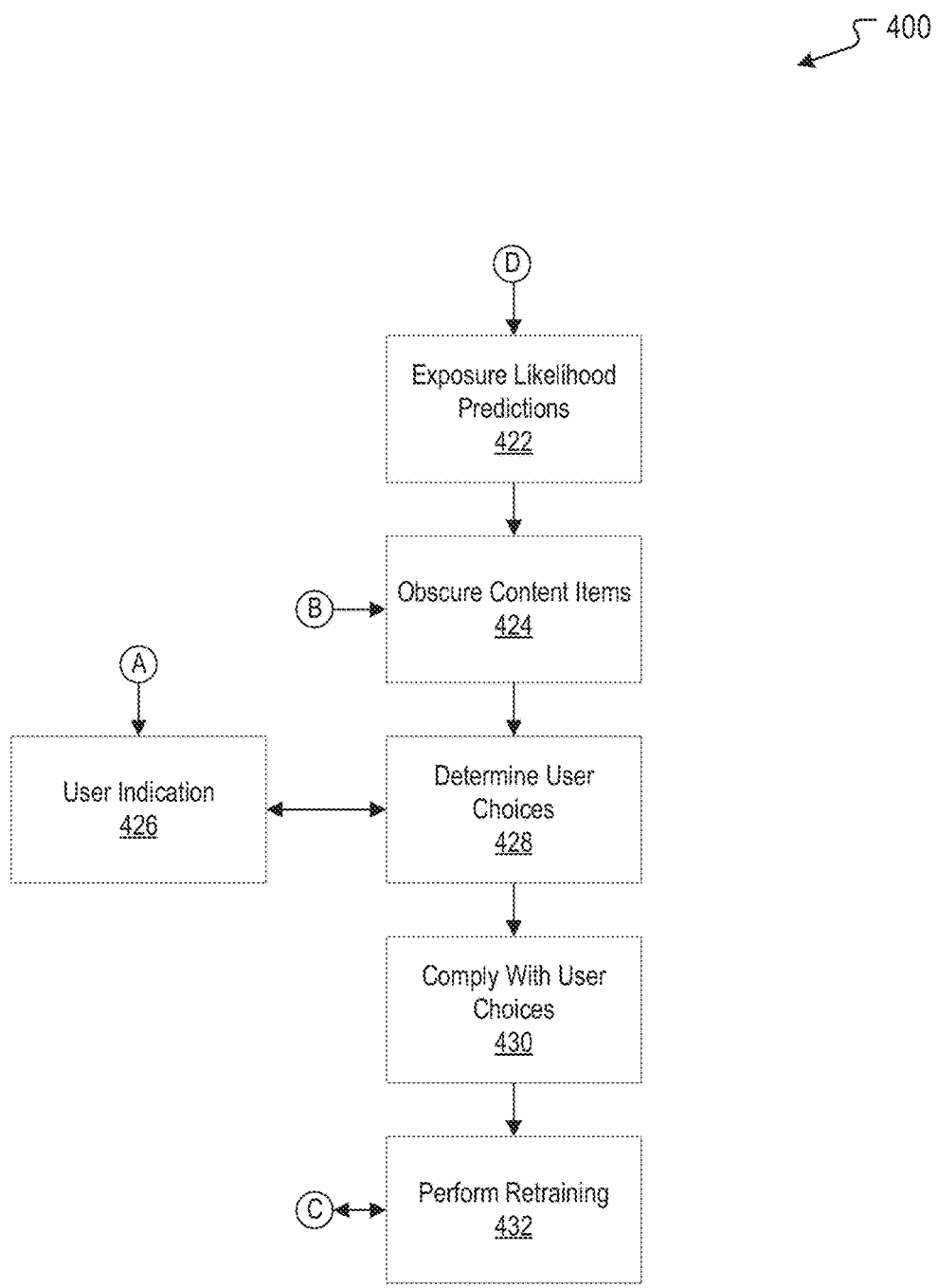

FIGS. 4A and 4B illustrate an example functional block diagram 400, according to an embodiment of the present disclosure. The example functional block diagram 400 illustrates using sensitive content screens when presenting content items to users, according to an embodiment of the present disclosure. At block 406, a user 404 can perform a content-seeking action. As examples, the content-seeking action can be the user accessing his or her feed, performing a search for content items, or visiting a profile accessible through a social networking system. Subsequently, at block 408 the sensitive content manager module 102 can select content items to present to the user. These content items can be selected from among available content items 402. The selection can result in content items 410.

At block 414, the sensitive content manager module 102 can utilize a first machine learning model 412 to determine sensitive content categories and/or sensitive content scores for the selected content items 410. The determination can result in sensitive content categories and/or sensitive content scores 416. At block 420, the sensitive content manager module 102 can utilize a second machine learning model 418 to generate exposure likelihood predictions for the selected content items 410 based on the sensitive content categories and/or sensitive content scores 416. Each of the predictions can indicate whether the user 404 would reveal (or view) a given one of the selected content items 410 if the content item was obscured by a sensitive content screen. The use of the second machine learning model 418 can result in exposure likelihood predictions 422, as illustrated in FIG. 4B. The sensitive content manager module 102 can use the sensitive content categories and/or sensitive content scores 416 in formulating the exposure likelihood predictions 422. In some embodiments, the exposure likelihood predictions 422 can be customized for the user 404.

At block 424, the sensitive content manager module 102 can obscure one or more of the selected content items 410 with sensitive content screens. The sensitive content manager module 102 can select an extent to which to obscure each of the one or more of the selected content items 410. In some embodiments, the extent to which a given content item is obscured can be determined based on a corresponding one of the exposure likelihood predictions 422. Also at block 424, the sensitive content manager module 102 can provide the obscured content items for presentation to the user 404.

At block 428, the sensitive content manager module 102 can determine whether the user chooses to reveal (or view) any of the obscured content items. The determination can take into account indications 426 by the user 404. At block 430, the social networking can comply with the choices of the user 404. As a result, the sensitive content manager module 102 can provide unobscured versions of those content items which the user 404 has chosen to reveal. Subsequently, at block 432 the sensitive content manager module 102 can retrain the second machine learning model based on the choices of the user 404. While the foregoing has been provided as an illustration, many variations are possible in accordance with the present technology.

Figure 4C:
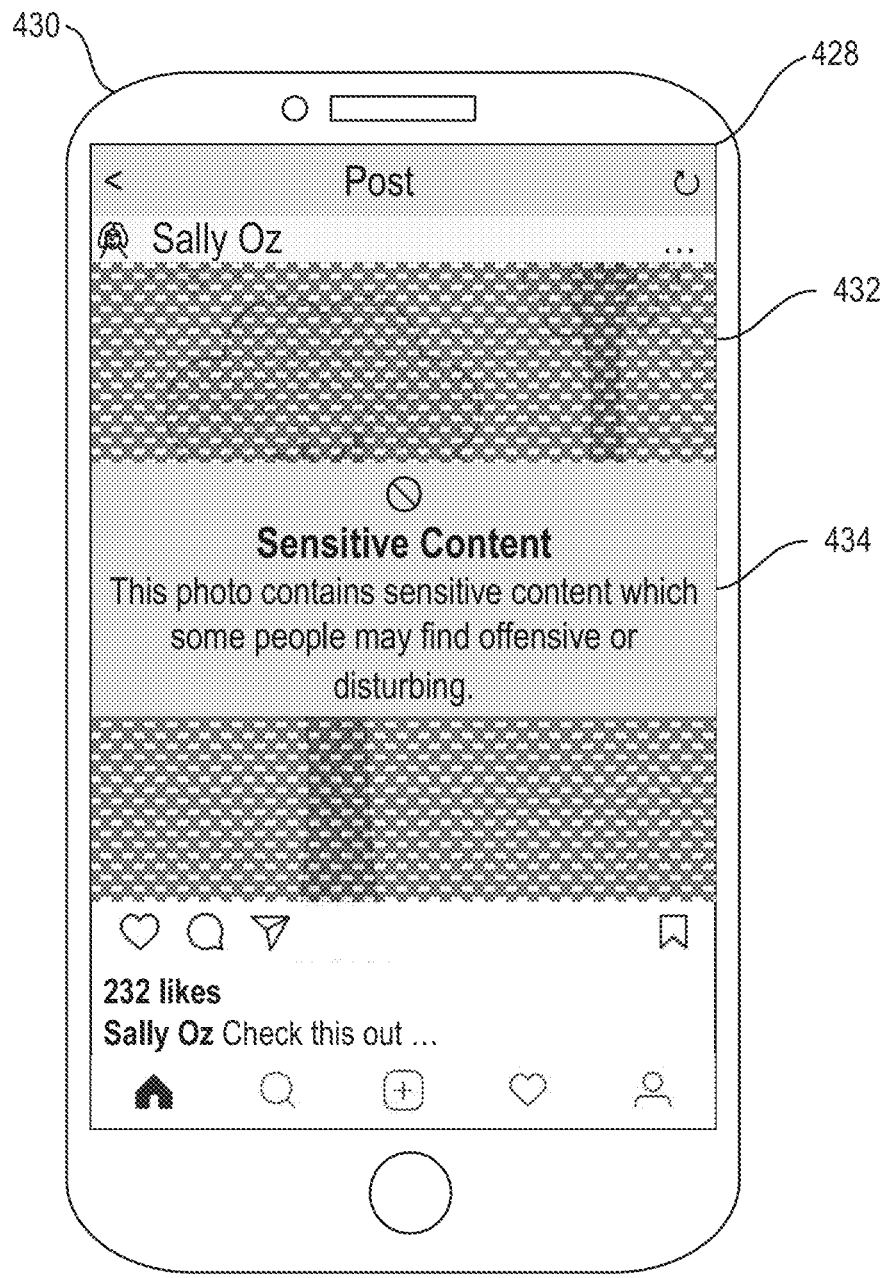
FIG. 4C illustrates an example interface, according to an embodiment of the present disclosure.

FIG. 4C illustrates an example of an interface 428, according to an embodiment of the present disclosure. The interface can be presented on the display of a computing device 430 being operated by a user. The interface 428 can be provided through an application (e.g., dedicated software application, web browser, etc.) running on the computing device 430.

The interface 428 can include a content item display region 432. In the example of FIG. 4C, a content item is shown within the content item display region 432. In this example, the content item has been obscured by a sensitive content screen. Here, the sensitive content screen is an overlay that obscures (or masks) subject matter captured in the content item. There are many ways to obscure content using sensitive content screens. For example, in some embodiments, the sensitive content screen can apply a blurring effect. Many variations are possible. FIG. 4C also illustrates an example text overlay 434. The text overlay 434 includes text which serves to warn a user about the sensitive nature of the content item. In particular, the text overlay 434 of the example of FIG. 4C sets forth the text "Sensitive Content" along with the text "This photo contains sensitive content which some people may find offensive or disturbing." In a different example, other text might be set forth.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can determine a likelihood of a user choosing to reveal a given content item when contents of the content item are obscured, the likelihood being determined based at least in part on a trained machine learning model. At block 504, the process can determine an extent by which to obscure the content item based at least in part on the likelihood.

Then, at block 506, the process can provide an obscured version of the content item for display, wherein the content item is obscured based at least in part on the determined extent.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
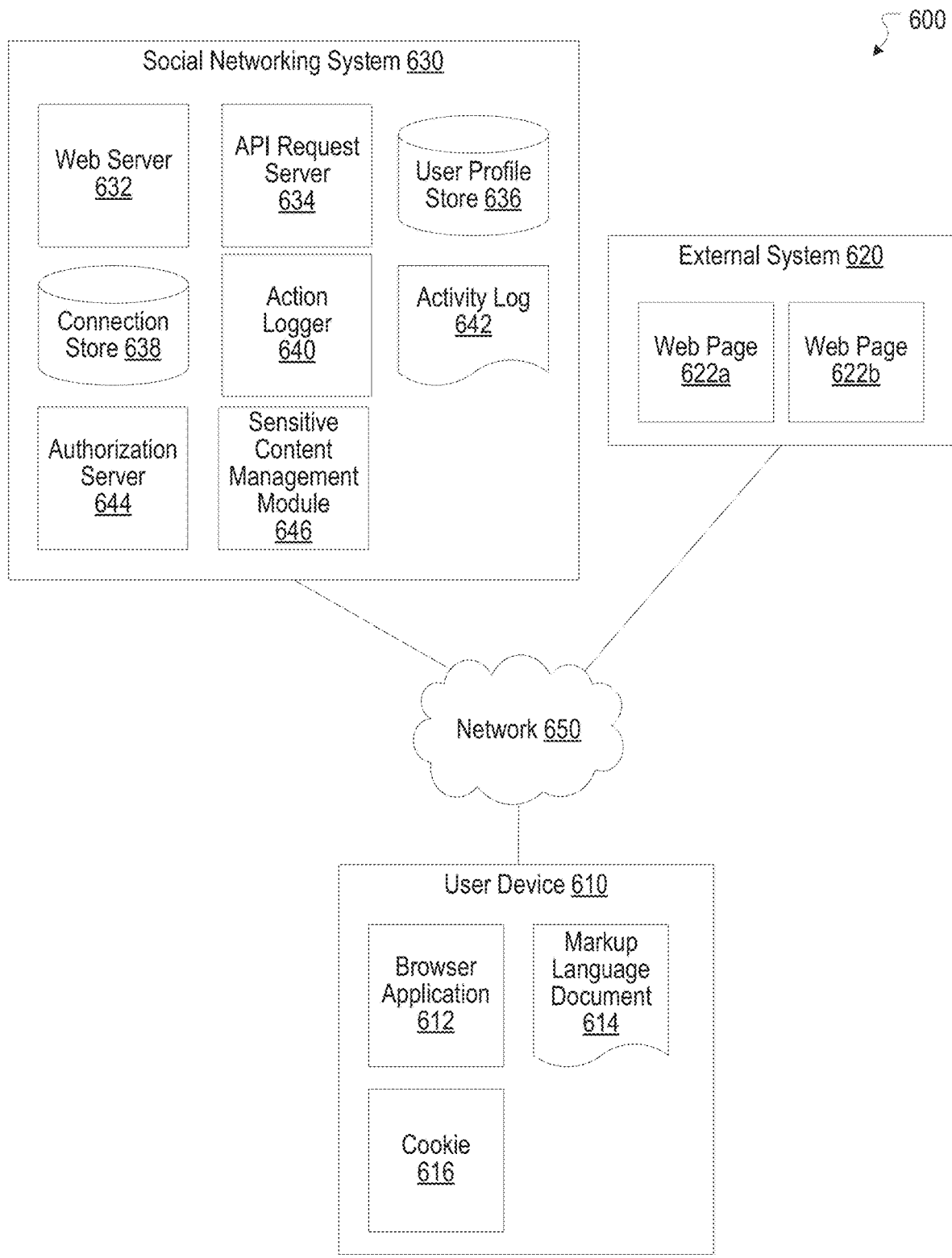
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a sensitive content management module 646. The sensitive content management module 646 can, for example, be implemented as the sensitive content management module 102 of FIG. 1. In some embodiments, some or all of the functionality of the sensitive content management module 646 (e.g., sub modules of the sensitive content management module 102) instead can be implemented in the user device 610.

Hardware Implementation

Figure 7:
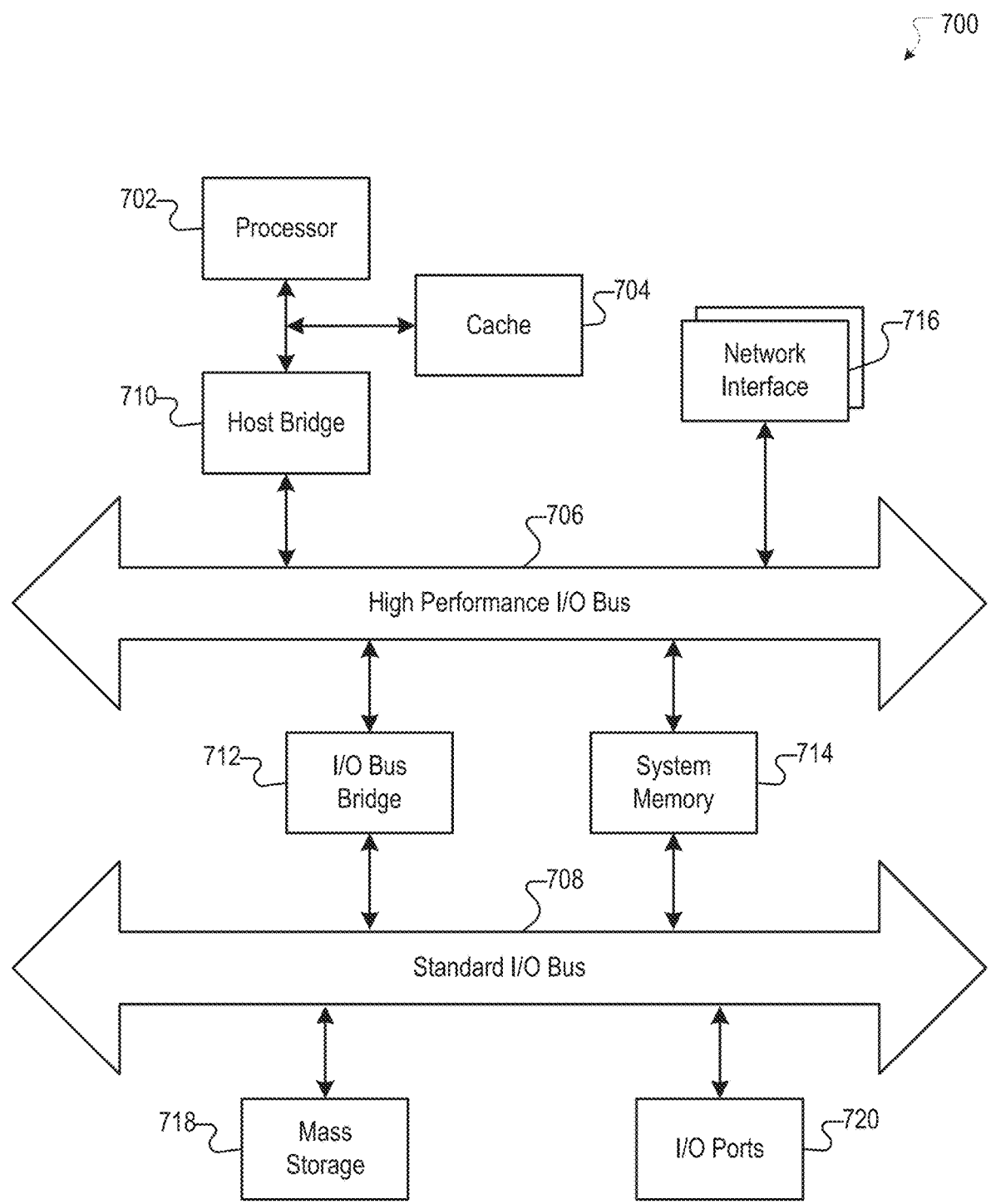
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a computing system, an obscured version of a content item, wherein the generating the obscured version of the content item comprises:
        determining a likelihood that a user will reveal the obscured version of the content item based at least in part on i) user feature data associated with the user, wherein the user feature data includes at least one of: demographic information or social networking system information, and ii) a machine learning model, and wherein the generating the obscured version of the content item further comprises at least one of:
            applying a color, wherein an opacity of the color is inversely proportional to the likelihood that the user will reveal the obscured version of the content item, or
            applying a blur, wherein an intensity of the blur is inversely proportional to the likelihood that the user will reveal the obscured version of the content item; and
    providing, by the computing system, the obscured version of the content item for display.

2. The computer-implemented method of claim 1, further comprising:
    providing, by the computing system, to the machine learning model, content item feature data, wherein the content item feature data comprises one or more of a sensitive content category or a sensitive content score.

3. The computer-implemented method of claim 1, further comprising:
    providing, by the computing system, to the machine learning model, the user feature data.

4. The computer-implemented method of claim 1, wherein the generating the obscured version of the content item further comprises at least one of:
    applying the color or applying the blur to a full version of the content item; or
    applying the color or applying the blur to a thumbnail version of the content item.

5. The computer-implemented method of claim 1, further comprising:
    applying, by the computing system, a text overlay, wherein the text overlay provides a sensitive content warning.

6. The computer-implemented method of claim 1, wherein the obscured version of the content item is provided via one or more of a profile, a feed, or a single content item display.

7. The computer-implemented method of claim 1, further comprising:
    receiving, by the computing system, an exposure indication; and
    retraining, by the computing system, based on the exposure indication, the machine learning model.

8. The computer-implemented method of claim 7, further comprising:
    complying, by the computing system, with the exposure indication.

9. The computer-implemented method of claim 1, further comprising:
    providing, by a computing system, to a second machine learning model, a content item representation; and
    receiving, by the computing system, from the second machine learning model, one or more of a sensitive content category or a sensitive content score.

10. The computer-implemented method of claim 9, wherein the content item representation comprises one or more concepts.

11. A system comprising:
    at least one processor; and
    a memory storing instructions that, when executed by the at least one processor, cause the system to perform:
        generating an obscured version of a content item, wherein the generating the obscured version of the content item comprises:
            determining a likelihood that a user will reveal the obscured version of the content item based at least in part on i) user feature data associated with the user, wherein the user feature data includes at least one of:
            demographic information or social networking system information, and ii) a machine learning model, and wherein the generating the obscured version of the content item further comprises at least one of:
applying a color, wherein an opacity of the color is inversely proportional to the likelihood that the user will reveal the obscured version of the content item; or
applying a blur, wherein an intensity of the blur is inversely proportional to the likelihood that the user will reveal the obscured version of the content item; and
providing the obscured version of the content item for display.

12. The system of claim 11, wherein the instructions, when executed by the at least one processor, further cause the system to perform:
providing to the machine learning model, content item feature data, wherein the content item feature data comprises one or more of a sensitive content category or a sensitive content score.

13. The system of claim 11, wherein the instructions, when executed by the at least one processor, further cause the system to perform:
providing to the machine learning model, the user feature data.

14. The system of claim 11, wherein the generating the obscured version of the content item further comprises at least one of:
applying the color or applying the blur to a full version of the content item; or
applying the color or applying the blur to a thumbnail version of the content item.

15. The system of claim 11, wherein the instructions, when executed by the at least one processor, further cause the system to perform:
receiving an exposure indication; and
retraining based on the exposure indication, the machine learning model.

16. A non-transitory computer-readable storage medium including instructions that, when executed by at least one processor of a computing system, cause the computing system to perform a method comprising:
generating an obscured version of a content item, wherein the generating the obscured version of the content item comprises:
determining a likelihood that a user will reveal the obscured version of the content item based at least in part on i) user feature data associated with the user, wherein the user feature data includes at least one of: demographic information or social networking system information, and ii) a machine learning model,
and wherein the generating the obscured version of the content item further comprises at least one of:
applying a color, wherein an opacity of the color is inversely proportional to the likelihood that the user will reveal the obscured version of the content item; or
applying a blur, wherein an intensity of the blur is inversely proportional to the likelihood that the user will reveal the obscured version of the content item; and
providing the obscured version of the content item for display.

17. The non-transitory computer-readable storage medium of claim 16, wherein the instructions, when executed by the at least one processor of the computing system, further cause the computing system to perform:
providing to the machine learning model, content item feature data, wherein the content item feature data comprises one or more of a sensitive content category or a sensitive content score.

18. The non-transitory computer-readable storage medium of claim 16, wherein the instructions, when executed by the at least one processor of the computing system, further cause the computing system to perform:
providing to the machine learning model, the user feature data.

19. The non-transitory computer-readable storage medium of claim 16, wherein the generating the obscured version of the content item further comprises at least one of:
applying the color or applying the blur to a full version of the content item; or
applying the color or applying the blur to a thumbnail version of the content item.

20. The non-transitory computer-readable storage medium of claim 16, wherein the instructions, when executed by the at least one processor of the computing system, further cause the computing system to perform:
receiving an exposure indication; and
retraining based on the exposure indication, the machine learning model.

* * * * *